(12) United States Patent
Stoner

(10) Patent No.: US 7,874,603 B2
(45) Date of Patent: Jan. 25, 2011

(54) CONSOLE RETAINER WITH INTEGRATED SHIFTER RETENTION

(75) Inventor: Kenneth A. Stoner, Northville, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 161 days.

(21) Appl. No.: 12/430,952

(22) Filed: Apr. 28, 2009

(65) Prior Publication Data

US 2010/0270456 A1 Oct. 28, 2010

(51) Int. Cl.
*B60R 13/00* (2006.01)

(52) U.S. Cl. .................. 296/24.34; 74/473.15

(58) Field of Classification Search ............. 296/24.34, 296/37.8; 180/326, 336; 74/473.1, 543, 74/473.15, 523, 473.21
See application file for complete search history.

(56) References Cited

U.S. PATENT DOCUMENTS

| | | | | |
|---|---|---|---|---|
| 4,873,884 | A * | 10/1989 | Yamada et al. ................. | 74/523 |
| 5,309,783 | A * | 5/1994 | Doolittle et al. ........... | 74/473.21 |
| 5,560,253 | A * | 10/1996 | Ishikawa et al. ............ | 74/473.3 |
| 5,582,073 | A * | 12/1996 | Takeuchi et al. .......... | 74/473.23 |
| 5,887,485 | A * | 3/1999 | VanOrder et al. ......... | 74/473.15 |
| 5,970,814 | A * | 10/1999 | Smith et al. ............... | 74/473.15 |
| 6,082,217 | A * | 7/2000 | Wheeler .................... | 74/483 R |
| 6,520,043 | B1 * | 2/2003 | Wang ....................... | 74/473.15 |
| 7,152,897 | B2 | 12/2006 | Bonnes et al. | |
| 7,195,095 | B2 * | 3/2007 | Oana .......................... | 296/37.8 |
| 7,270,623 | B2 * | 9/2007 | Wang ........................... | 477/96 |
| 7,393,304 | B2 * | 7/2008 | Wilde et al. ................. | 74/473.3 |
| 7,571,661 | B2 * | 8/2009 | Blondeel et al. ........... | 74/473.1 |
| 2007/0144291 | A1 | 6/2007 | Tanner | |
| 2009/0120231 | A1 * | 5/2009 | Ruhlander et al. ......... | 74/502.4 |

* cited by examiner

*Primary Examiner*—Kiran B. Patel

(57) ABSTRACT

A console retainer mounts to a floor of a motor vehicle and receives a floor transmission shifter assembly. The shifter assembly has a forward end and a rearward end. The console retainer includes a frame portion for coupling to the floor and configured to receive at least one console trim piece. A pair of lateral side walls are integrally formed with the frame portion as a molded thermoplastic unit, wherein the lateral side walls are substantially parallel to delimit a mounting space for the shifter assembly therebetween, wherein the lateral side walls each have a forward retention feature for fixedly retaining the forward end of the shifter assembly, and wherein the lateral side walls each have a rearward retention feature for fixedly retaining the rearward end of the shifter assembly.

6 Claims, 7 Drawing Sheets

CONSOLE RETAINER WITH INTEGRATED SHIFTER RETENTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to floor consoles for transportation vehicles, and, more specifically, to a console retainer for receiving a transmission shifter assembly.

Cars and trucks have used floor mounted transmission shifters for many years. In the earliest applications, floor transmission shifters were mounted on directly to the floor of a vehicle using a mounting bracket.

The use of a floor mounted console between front driver and passenger seats of vehicles has become popular for many different vehicle types such as sedans, sport utility vehicles, and trucks. A floor console typically has a retainer or frame which is mounted to the floor and is used as a base for receiving various console trim pieces (such as a storage bin, a cup holder, and various finishing panels). In some designs, the transmission shifter is contained within the floor console by mounting the shifter bracket onto the console retainer and then installing the shifter assembly onto the bracket.

The shifter bracket is typically mounted using several bolts and nuts. In order to mount the bracket onto a console retainer, sufficient space must be provided to accommodate the bolts and nuts after installation and to permit access by the tools used to install the bracket (such as a wrench or other driver). For example, scallops in various walls of the console retainer may be required in order to facilitate insertion of an assembly tool. Furthermore, a space must be provided below the console retainer to accommodate the required bolts. Because of the space requirements for the shifter bracket, prior art console retainers have used packaging space within the vehicle inefficiently. As a result, there is less space for mounting a console bin or other console features, and the area available for constructing an air-conditioning duct within the console retainer is reduced, thereby reducing the flow capacity of the duct.

SUMMARY OF THE INVENTION

The present invention overcomes the shortcomings of the prior art by providing a direct mounting of the shifter assembly to the console retainer without a separate bracket. Particular features are shaped into the console retainer so that all space is efficiently used and a simple assembly process is obtained.

In one aspect of the invention, a console retainer is provided for mounting to a floor of a motor vehicle and for receiving a floor transmission shifter assembly. The shifter assembly has a forward end and a rearward end. The console retainer includes a frame portion for coupling to the floor and configured to receive at least one console trim piece. A pair of lateral side walls are integrally formed with the frame portion as a molded thermoplastic unit, wherein the lateral side walls are substantially parallel to delimit a mounting space for the shifter assembly therebetween, wherein the lateral side walls each have a forward retention feature for fixedly retaining the forward end of the shifter assembly, and wherein the lateral side walls each have a rearward retention feature for fixedly retaining the rearward end of the shifter assembly.

DETAILED DESCRIPTION OF PREFERRED EMBODIMENTS

Figure 1:
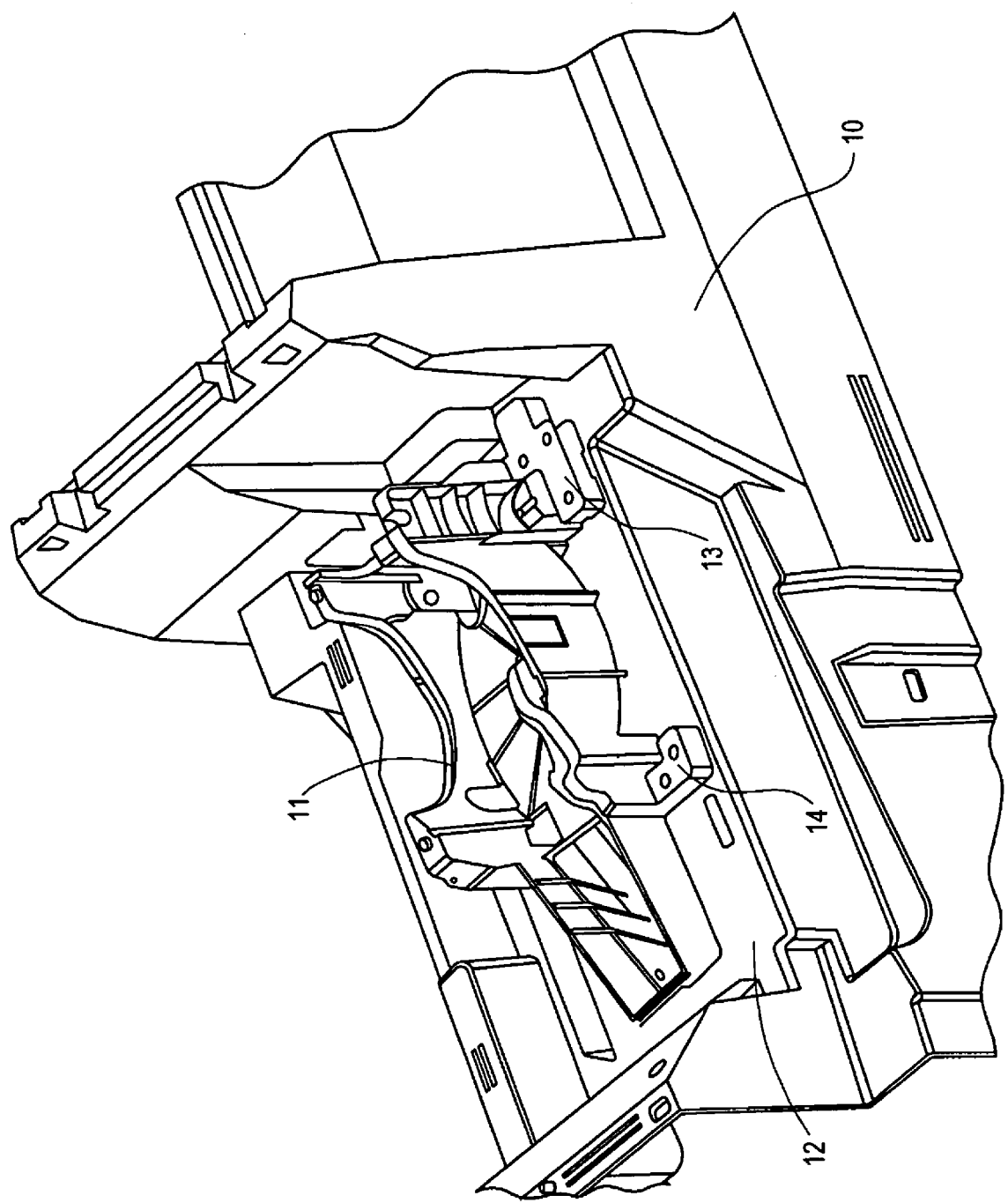
FIG. 1 is a perspective view of a prior art console retained with a separate bracket for mounting a transmission shifter assembly.

Referring to FIG. 1, a prior art console retainer 10 attaches to a vehicle floor (not shown) and is adapted to receive various console accessories, including a bracket 11 which acts as an adaptor to receive a transmission shifter assembly. Console retainer 10 has a substantially flat surface 12 for receiving bracket 11. Bracket 11 includes flanges such as flange 13 and flange 14 with respective through-holes for lining up with matching holes (not shown) in surface 12 so that bracket 11 can be bolted to retainer 10. Surface 12 is typically spaced from the vehicle floor to provide an area beneath it for receiving the bolt and/or and nuts used to attach bracket 11 as well as providing a space for receiving a bolt installation or removal tool. Thus, the prior art design shown in FIG. 1 devotes packaging space within the console to the shifter assembly retention function greater than just the area taken up by bracket 11. Furthermore, the bolt holes result in reduced stiffness of console retainer 10 which may allow for undesirable "play" or movement of the shifter assembly during usage.

Figure 2:
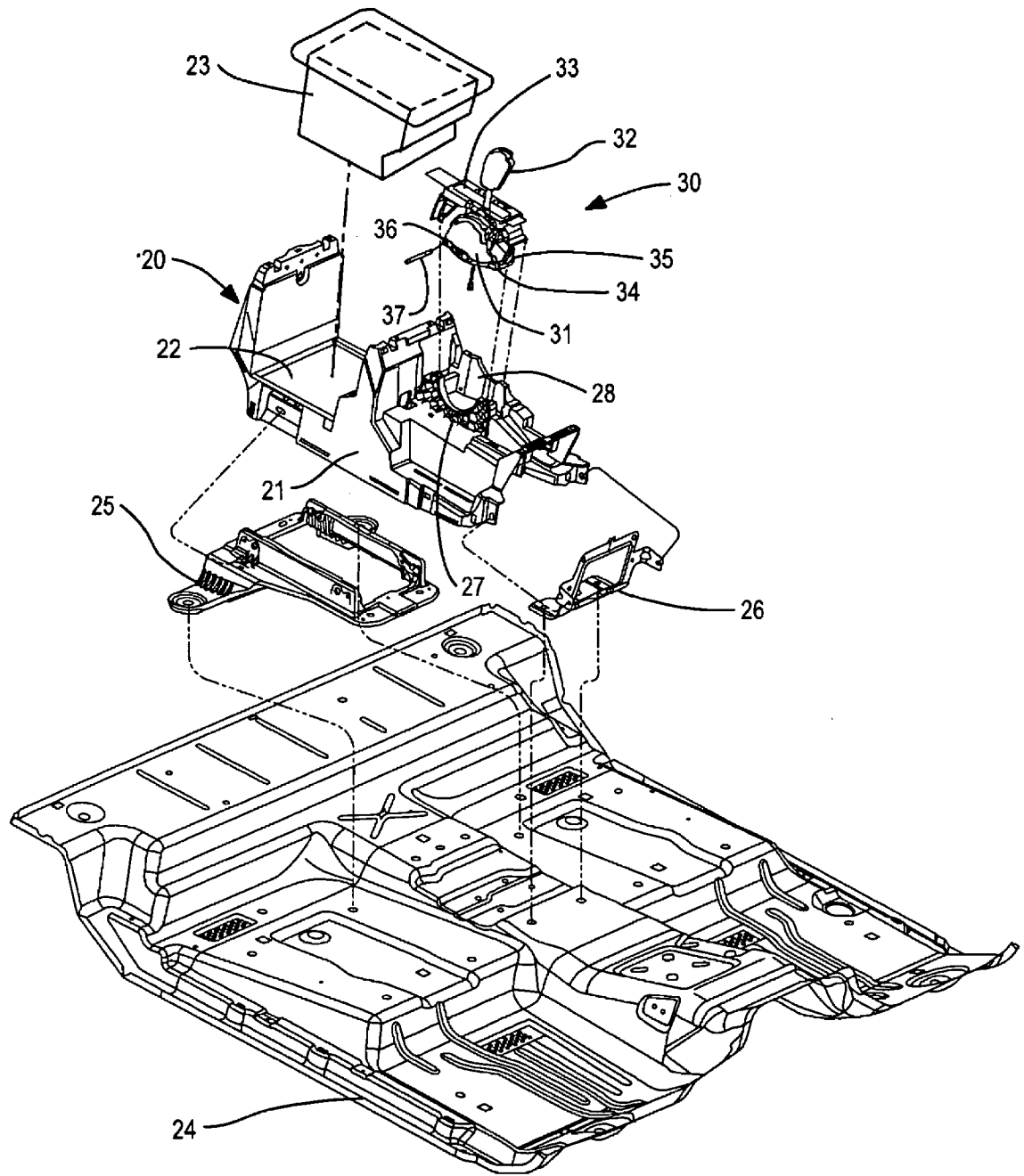
FIG. 2 is an exploded, perspective view of a console retainer of the present invention together with associated vehicle components.

FIG. 2 shows an improved console retainer 20 according to the present invention. Console retainer 20 comprises a frame portion 21 that is adapted to receive and support various console trim pieces. Frame portion 21 includes a recess 22 adapted to mount a console bin 23, for example. Frame portion 21 is mounted to a floor pan 24 via brackets 25 and 26 using bolts or other conventional means of attachment.

Console retainer 20 further comprises a pair of lateral side walls 27 and 28 that are integrally formed with the frame portion as a single molded thermoplastic unit. Lateral side walls 27 and 28 are shaped in a manner that provides a mounting point for the transmission shifter assembly. Conventional molding methods and materials (e.g., thermoplastics) are employed. Since lateral side walls 27 and 28 are molded together with frame portion 21 of console retainer 20, there are no bolt attachment holes associated with mounting a shifter assembly that would otherwise reduce the stiffness of console retainer 20. Furthermore, the packaging space requirements for mounting the shifter assembly are reduced, thereby providing more available space for an air duct, the console bin, or other trim pieces of the console.

Lateral side walls 27 and 28 are substantially parallel in order to delimit a mounting space for receiving a shifter assembly 30 therebetween. As described in greater detail below, lateral side walls 27 and 28 each have a forward retention feature for fixedly retaining the forward end of shifter assembly 30 and each has a rearward retention feature for fixedly retaining the rearward end of shifter assembly 30. Shifter assembly 30 comprises a switch housing 31 containing electrical switches controlled by a shift lever 32. A shifter bezel 33 has a slot for receiving shift lever 32 and has means for separately attaching to lateral side walls 27 and 28. Housing 31 has outwardly-extending flanges 34 and 35 at the forward end of shifter assembly 30. The rearward end of shifter assembly 30 includes a transverse passage 36 for receiving a retention pin 37.

Figure 3:
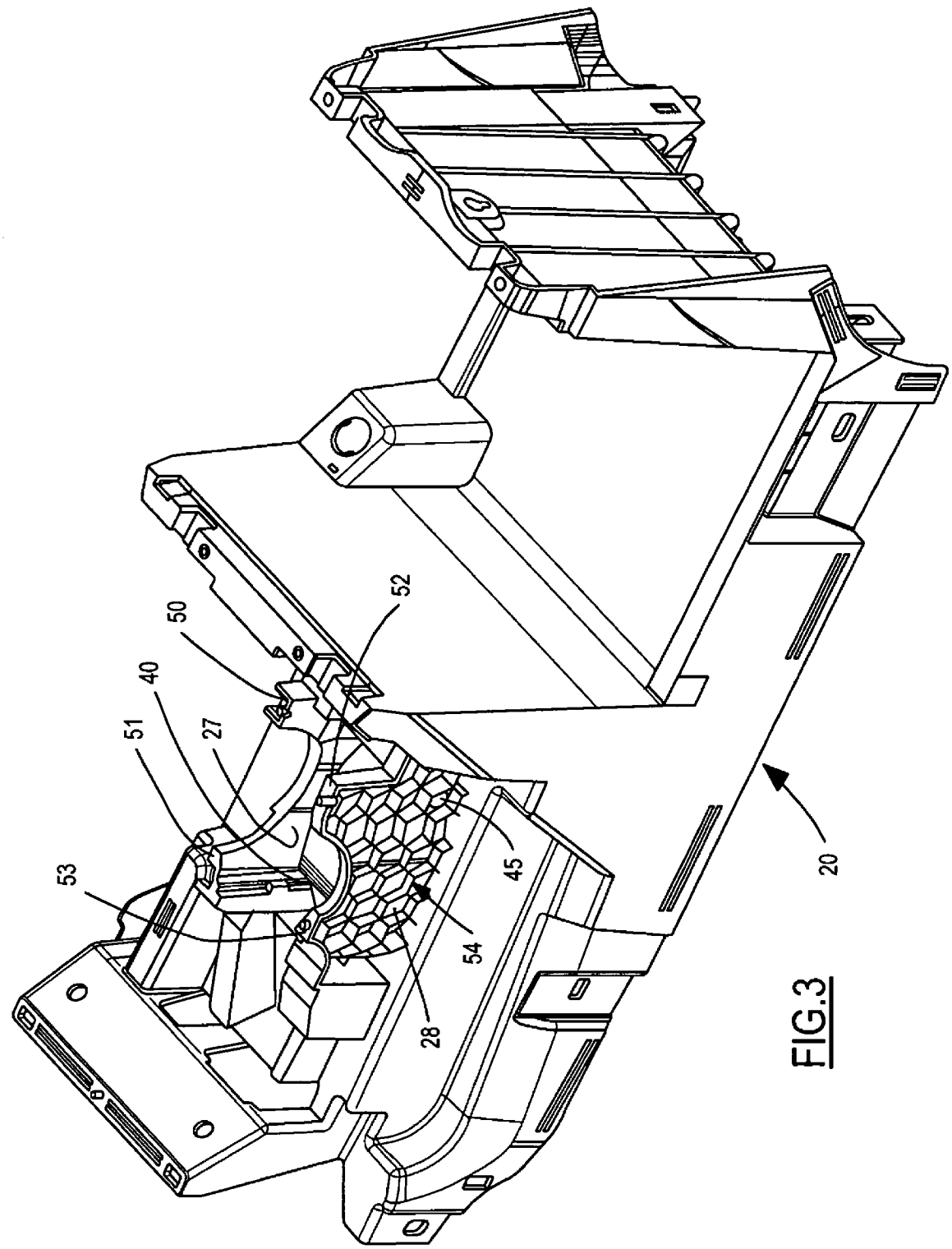
FIG. 3 is a top, left, rear perspective view of one preferred embodiment of the invention.
Figure 4:
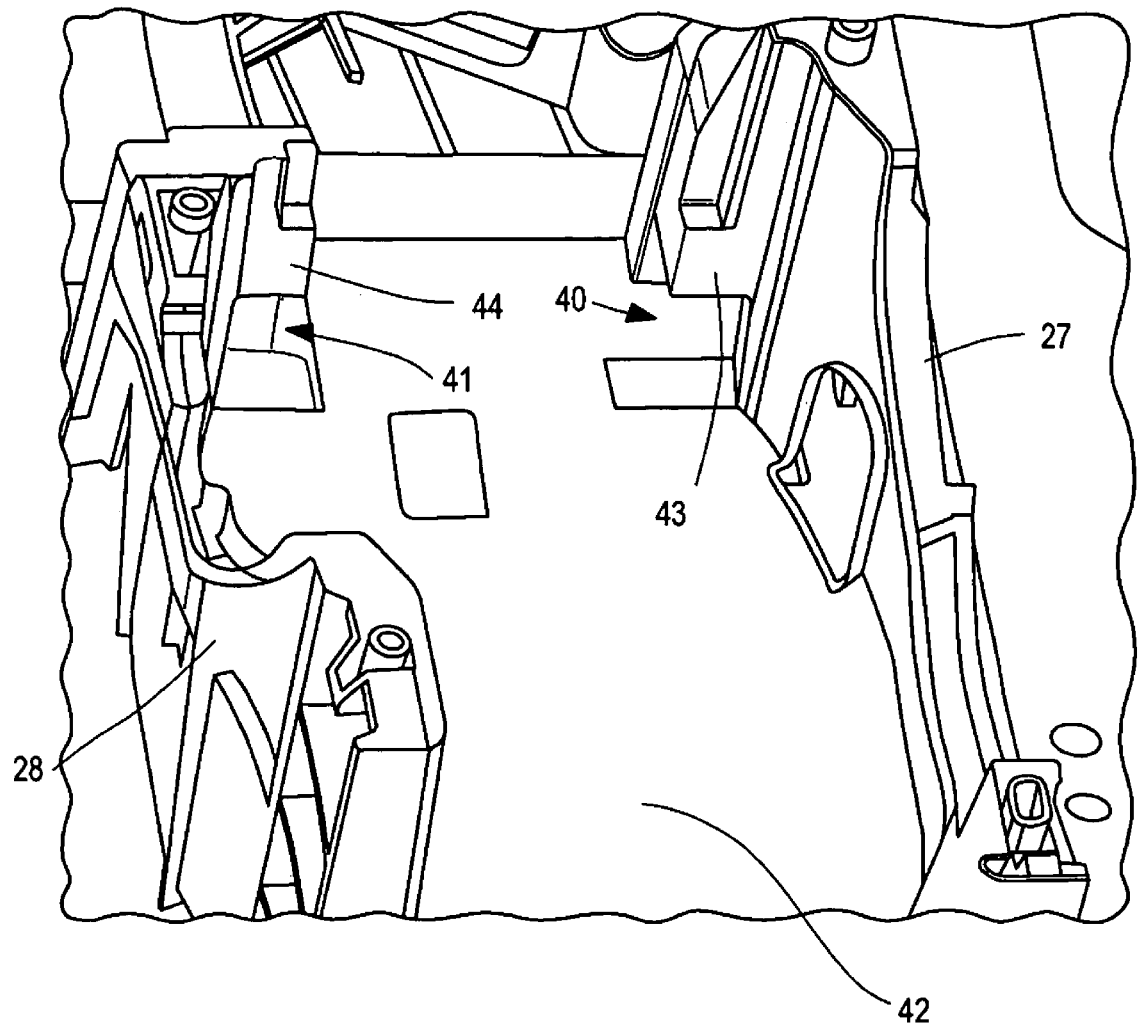
FIG. 4 is a rear perspective view of the embodiment of FIG. 3 showing the forward retention feature.
Figure 5:
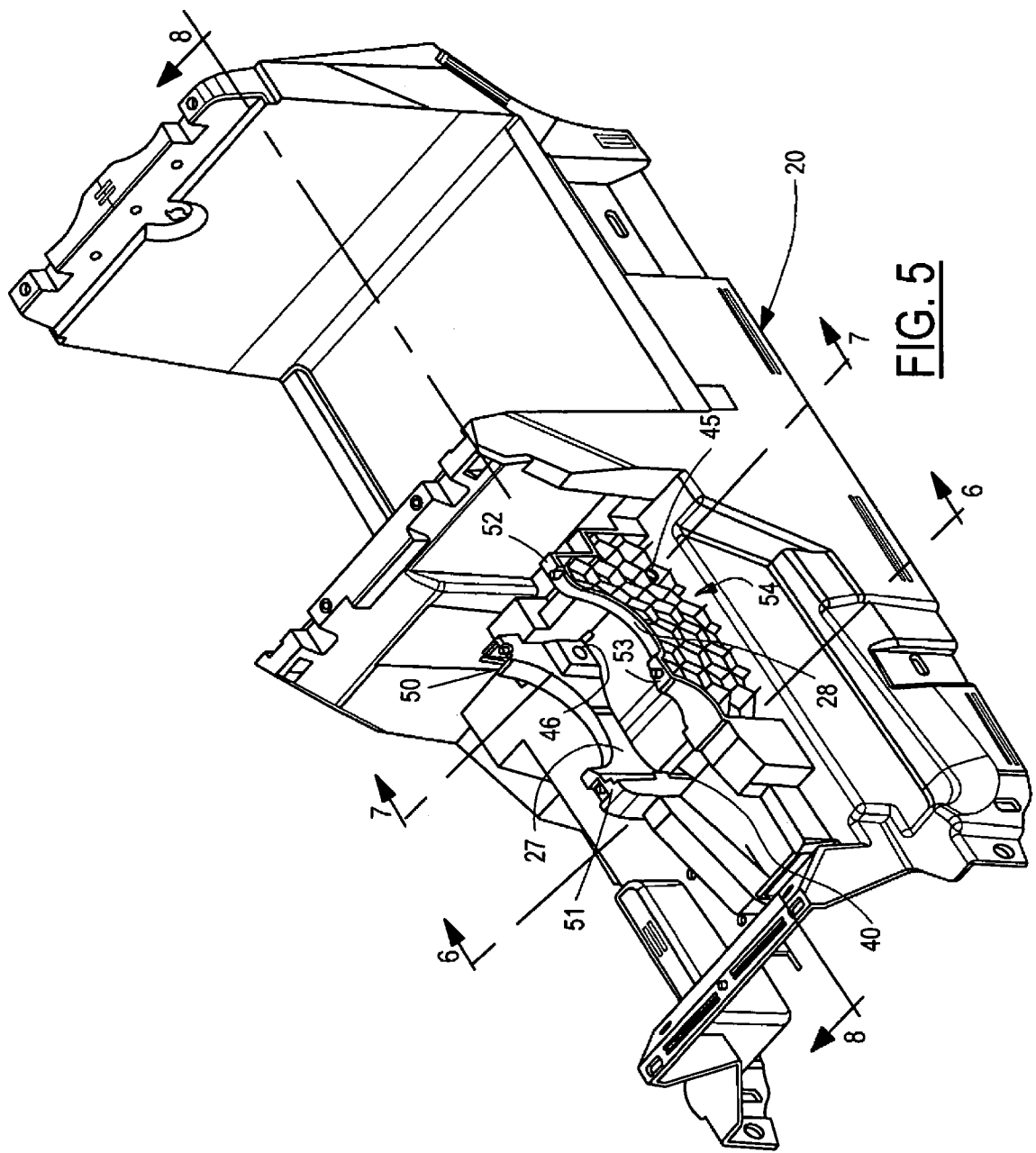
FIG. 5 is a top, left, front perspective view of the embodiment of FIG. 3.

Lateral side walls 27 and 28, the forward retention feature, and the rearward retention feature are shown in greater detail for one preferred embodiment in FIGS. 3-5. While lateral side walls 27 and 28 are substantially parallel, they may be slightly concave (at least on their inside surfaces) so that the mounting space between them has a central bulge corresponding to the overall shape of transmission shifter assembly 30.

In the illustrated embodiment, the forward retention feature comprises a pair of toe-in slots 40 and 41 between a bottom surface 42 and bearing tabs 43 and 44 formed in lateral side walls 27 and 28, respectively. Toe-in slots 40 and 41 receive outward-extending flanges 34 and 35, respectively, as transmission shifter assembly 30 is installed. After inserting flanges 34 and 35 into slots 40 and 41, transverse passage 36 of shifter assembly 30 is brought into alignment with a pair of aligned holes 45 and 46 comprising the rearward retention feature in lateral side walls 27 and 28. Pin 37 is then inserted through holes 45 and 46 and passage 36 so that it is retained by an interference fit or by other conventional means.

For the purpose of mounting the bezel 33, lateral side wall 27 preferably includes upward projections 50 and 51 and lateral side wall 28 includes upward projections 52 and 53. Each upward projection 50-53 is adapted to mount a respective portion of bezel 33, such as by providing a post for mating with matching holes on bezel 33, by providing slots for receiving tab projections from bezel 33, or by providing other conventional means of attachment.

As shown in FIGS. 3 and 5, lateral side walls 27 and 28 may preferably include a reinforcement honeycomb comprising integrally molded partition walls 54. Partition walls 54 stiffen the lateral side walls while adding minimal weight. They may be integrally molded with lateral side walls 27 and 28.

Figure 6:
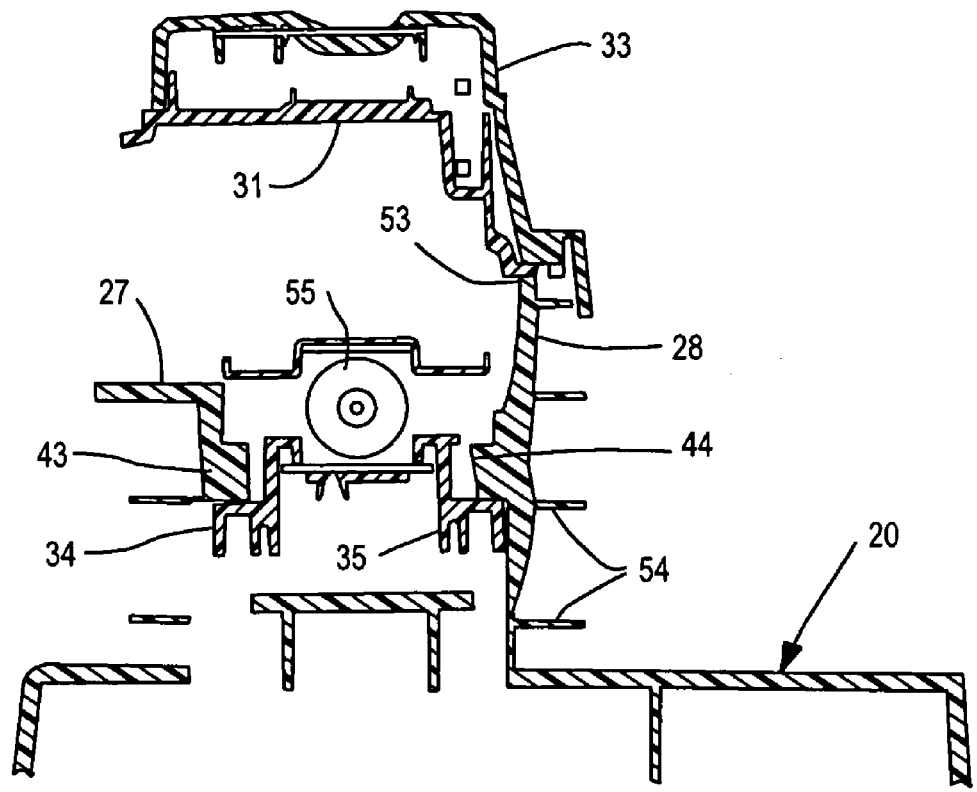
FIG. 6 is a cross section taken along line 6-6 of FIG. 5.

FIG. 6 is a transverse cross-section through the forward retention feature. Thus, flanges 34 and 35 are retained by bearing tabs 43 and 44. A portion of an internal mechanism 55 can be seen within shifter assembly 30 for converting the physical position of the shifter lever into an electrical signal.

Figure 7:
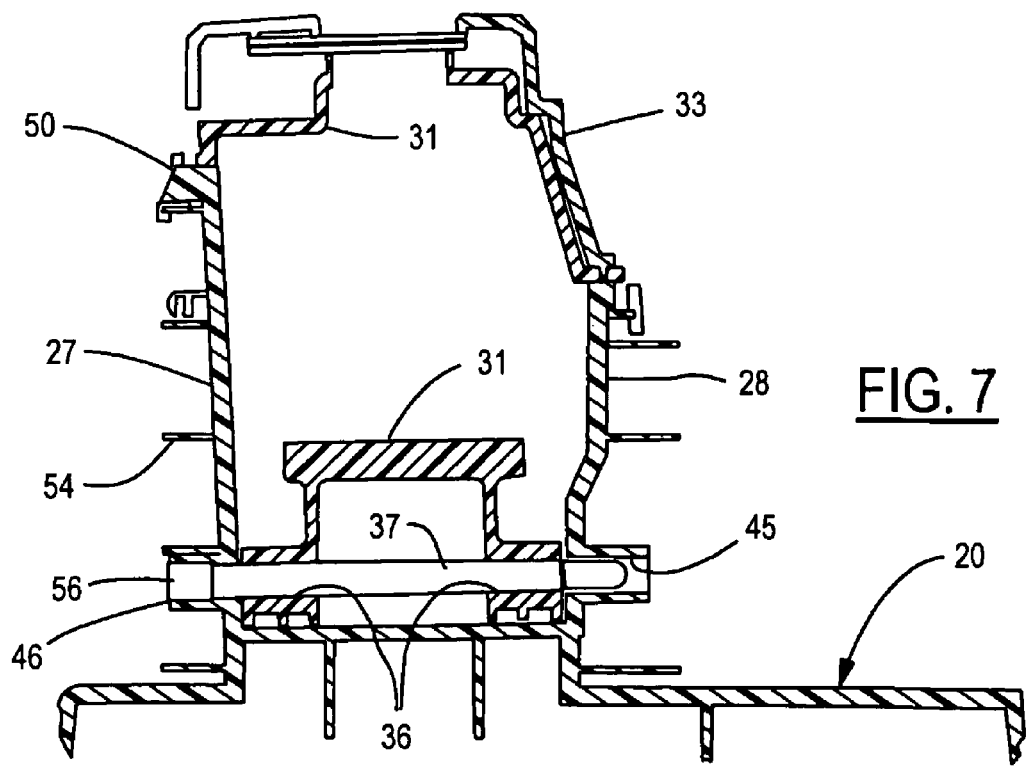
FIG. 7 is a cross section taken along line 7-7 of FIG. 5.

FIG. 7 shows a transverse cross-section through the rearward retention feature. Retention pin 37 passes through hole 46, passage 36, and hole 45, and has a stepped diameter. An end portion 56 of pin 37 may preferably have a diameter that results in an interference fit with hole 46.

Figure 8:
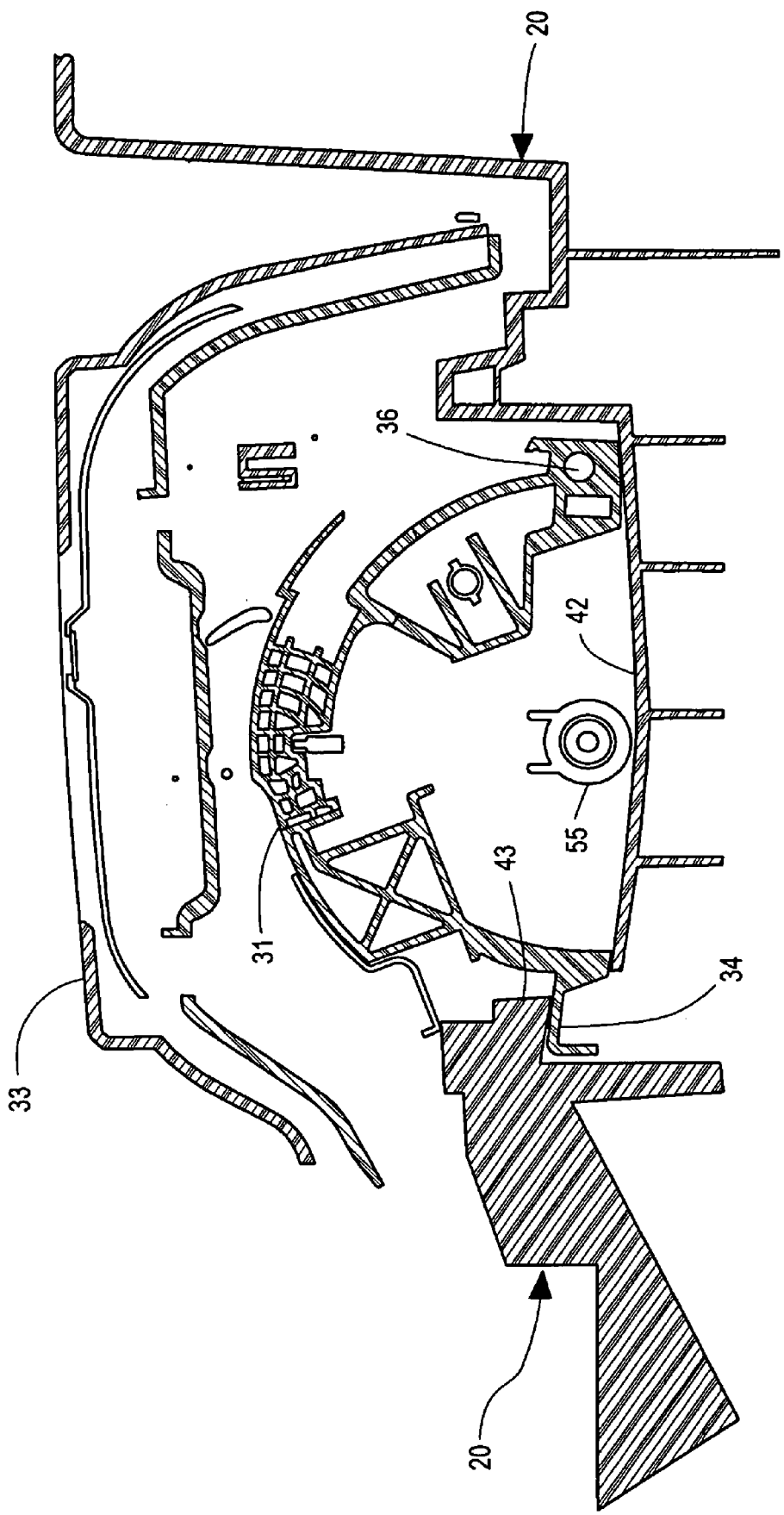
FIG. 8 is a cross section taken along line 8-8 of FIG. 5.

FIG. 8 is a longitudinal cross-section showing the transmission shifter assembly 30 in place within console retainer 20.

In view of the foregoing description, a direct mounting of the shifter assembly to the console retainer has been achieved without a separate bracket. By avoiding the use of bracket mounting bolts and tool-entry spaces, packaging space is more efficiently used, thereby resulting in more available space for a storage bin. All space is efficiently used, and a simple assembly process is obtained.

What is claimed is:

1. A console retainer for mounting to a floor of a motor vehicle and for receiving a floor transmission shifter assembly, wherein the shifter assembly has a forward end and a rearward end, comprising:

a frame portion for coupling to the floor and configured to receive at least one console trim piece;

a pair of lateral side walls integrally formed with the frame portion as a molded thermoplastic unit, wherein the lateral side walls are substantially parallel to delimit a mounting space for the shifter assembly therebetween, wherein the lateral side walls each have a forward retention feature for fixedly retaining the forward end of the shifter assembly, and wherein the lateral side walls each have a rearward retention feature for fixedly retaining the rearward end of the shifter assembly.

2. The console retainer of claim 1 wherein the lateral side walls are concave so that the mounting space has a central bulge.

3. The console retainer of claim 1 wherein the forward end of the shifter assembly includes an outward-extending flange, and wherein the forward retention feature is comprised of a toe-in slot formed by at least one of the lateral side walls.

4. The console retainer of claim 3 wherein the forward retention feature is comprised of a toe-in slot formed by each lateral side wall.

5. The console retainer of claim 1 wherein the rearward end of the shifter assembly includes a transverse passage, and wherein the rearward retention feature is comprised of aligned holes in the lateral side walls for aligning with the transverse passage so that a retention pin can be inserted through the aligned holes and transverse passage.

6. The console retainer of claim 1 wherein the lateral side walls each include a plurality of upward projections for attaching a bezel of the shifter assembly.

* * * * *